Feb. 24, 1970     J. H. STEWARD ET AL     3,496,980
CLIP NUT
Filed March 20, 1968     2 Sheets-Sheet 1
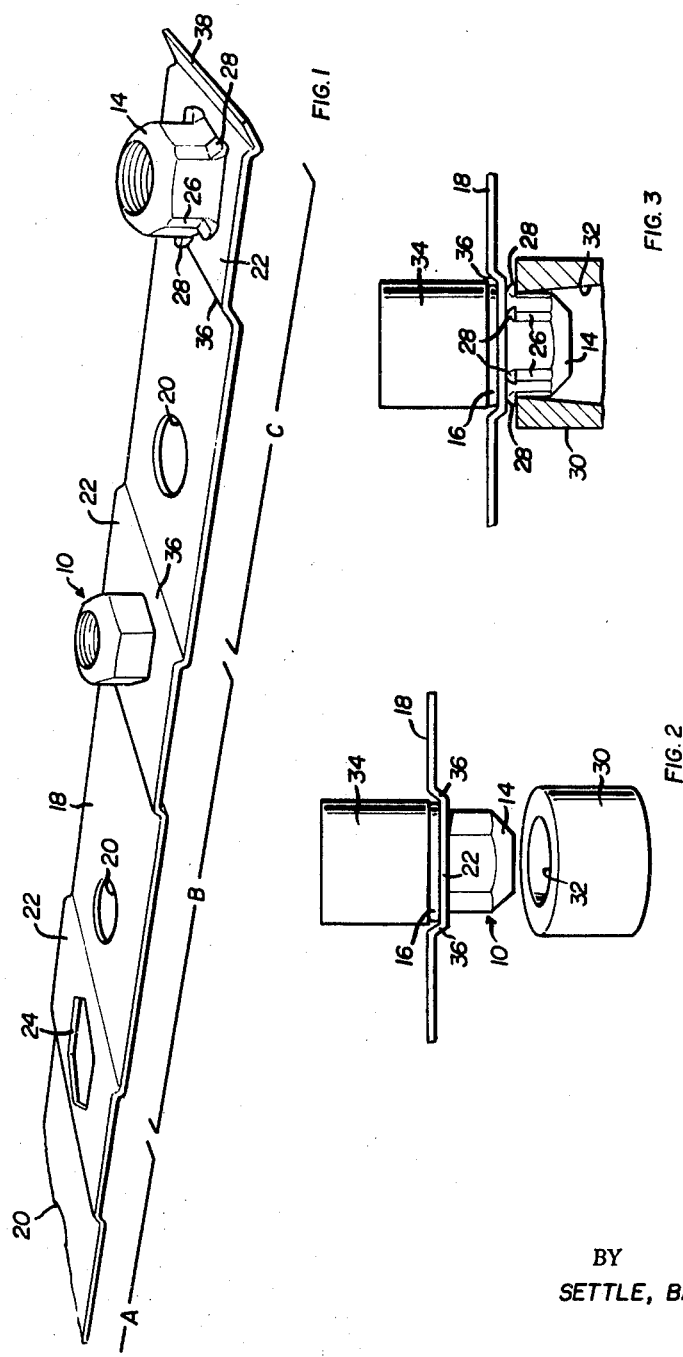
INVENTORS
JERRY H. STEWARD
FRANK W. KRING
BY
SETTLE, BATCHELDER & OLTMAN.
ATT'YS.

Feb. 24, 1970    J. H. STEWARD ET AL    3,496,980
CLIP NUT

Filed March 20, 1968    2 Sheets-Sheet 2

INVENTORS
JERRY H. STEWARD
FRANK W. KRING
BY
SETTLE, BATCHELDER & OLTMAN.
ATT'YS.

United States Patent Office 3,496,980
Patented Feb. 24, 1970

3,496,980
CLIP NUT
Jerry H. Steward, Bloomfield Hills, and Frank W. Kring, Farmington, Mich., assignors to Multifastener Corporation, Detroit, Mich., a corporation of Michigan
Filed Mar. 20, 1968, Ser. No. 714,571
Int. Cl. F16b 39/00
U.S. Cl. 151—41.75     2 Claims

ABSTRACT OF THE DISCLOSURE

A clip nut assembly having improved push-out resistance and bearing engagement characteristics. A hexagonal nut having a circular flange at one end is mounted in a U-shaped sheet metal clip with the flange engaged with the inner side of the clip at the concave side of a flat embossment on one leg of the clip.

---

The present invention is, to some extent, an improvement over the clip nut disclosed and claimed in U.S. Patent No. 3,283,794.

Clip nuts of the type to which the present invention is concerned are widely used for the purpose of fastening sheet metal panels to each other where, due to the configuration of the assembly, it is not possible or convenient to use a wrench or socket to hold the nut while a bolt is being threaded into the nut. In a clip nut, the nut is mounted in a U or J shaped sheet metal clip which is slipped over the edges of the sheet metal panels or through slots in the panel to hold the nut at the inaccessible side of the assembly while the bolt is being threaded into the nut.

The nuts employed are usually standard hexagonal nuts of the heavy series which, in the usual case are staked to the clip. Because the nut is normally located in an inaccessible position during the assembly, the bolt is always threaded into the nut from the inside of the clip. Nuts of this type are almost invariably used in mass production environments where the bolt is threaded into the nut by means of a power driven wrench. For purposes of clearance, only a minimum axial length of the nut is located on the inside of the leg of the clip and the substantial forces exerted by the power driven wrench give rise to a problem referred to as "push out" in which the nut is axially torn loose from the clip during the threading operation. Because of the fact that the smaller portion of the axial length of the nut is located on the inner side of the leg of the clip, it is the usual practice in assembling clip nuts of this type to perform the staking operation on the inner side of the clip so that the push out forces are resisted only by the staked portions of the nut.

In the present invention, a standard heavy series hexagonal nut has an integral circular flange formed at one end. The nut is mounted in a sheet metal clip with the circular flange engaged against the inner side of one leg of the clip. The clip is formed with a flat embossment which is offset outwardly from the general plane of the leg of the clip by a distance slightly in access of the axial thickness of the circular flange. The nut is staked to the clip from its outer side by a die having a circular recess of a diameter less than the across the corners dimension of the nut, but greater than the across the flats dimension of the nut. The die shaves metal from each corner of the nut and axially forces this metal against the outer side of the embossment in the form of a projection at each nut corner which cooperates with the circular flange to retain the nut against axial displacement relative to the clip. The embossment is integrally connected to the leg of the clip by inclined sections which extend across the entire transverse width of the clip leg. When a bolt is tightened into the nut, these sections on the clip yield resiliently so that the entire annular area of the circular flange is drawn into clamped bearing engagement with the panel.

Other objects and features of the invention will become apparent by reference to the following specification and to the drawings.

In the drawings:

FIGURE 1 is a perspective view of a sheet metal strip illustrating successive steps of a progressive die operation for assembling clip nuts embodying the present invention;

FIGURE 2 is a detailed view, partially in cross section, showing a nut in position in the clip just prior to the staking operation;

FIGURE 3 is a detailed cross sectional view similar to FIGURE 2 showing the die at the conclusion of the staking operation;

Figure 4:
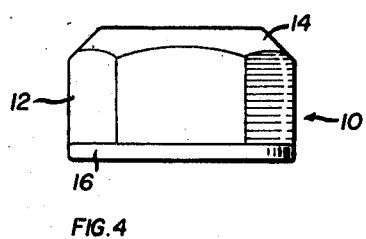
FIGURE 4 is a side elevational view of the nut.
Figure 5:
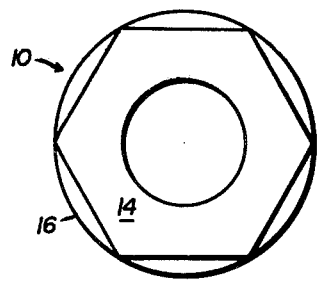
FIGURE 5 is a top elevational view of the nut.

Referring first to FIGURES 4 and 5, the nut is designated generally 10 and has a relatively axially thick body 12 of standard hexagonal dimensions. One end of the nut is formed with a conical pilot portion 14 while a circular flange 16 is formed on the opposite end of the nut, as by a cold forming operation. The diameter of the circular flange is approximately equal to the across the corners dimension of the nut so that the flange projects outwardly from the nut primarily in the regions of the flats. Preferably, the upper surface of the flange, as viewed in FIGURE 5, is flat, with a relatively small radius relief between the upper surface of the flange and the flat of the nut.

The clip nut of the present invention is formed and assembled in a progressive die operation, three stations of which are indicated at A, B and C of FIGURE 1, which shows the strip and nut as it might appear if removed from the die. The strip in FIGURE 1 is shown upside down as compared to its actual position in the progressive die, so that the operations on the nut can be shown more clearly.

At station A, the strip of sheet metal 18 has been formed with a circular opening 20 and a flat offset embossment 22 through which a hexagonal opening 24 has been punched. The embossment 22 extends across the entire transverse width of strip 18 and has a flat surface which is parallel to, but offset from the general plane of the strip as it travels through the progressive die.

At station B of FIGURE 1, a nut 10 has been inserted into the hexagonal opening.

At station C in FIGURE 1, the corners of the nuts have been shaved as at 26 to form outwardly projecting projections 28 which bear against the upper or convex side of embossment 22 and which cooperate with the circular flange 16 which is engaged with the underside of the embossment as viewed in FIGURE 1 to hold the nut against axial displacement relative to the embossment.

Figure 6:
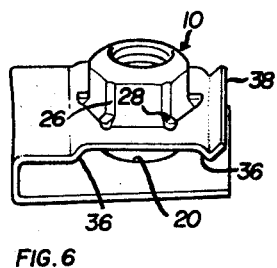
FIGURE 6 is a perspective view of a complete clip nut of the present invention.
Figure 7:
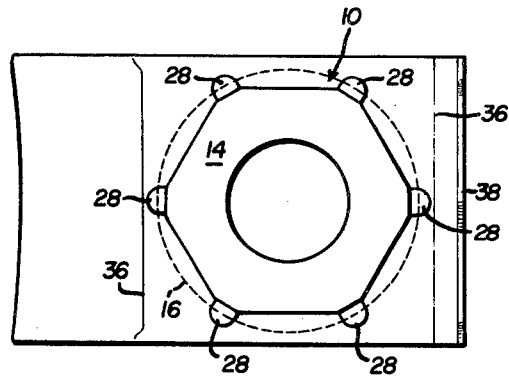
FIGURE 7 is a detailed top plan view of the nut.

At subsequent stations of the progressive die, the clip is severed from strip 18 and formed into the configuration shown in FIGURE 6.

Referring now to FIGURES 2 and 3, there are disclosed details of the staking or shaving operation performed at station C of FIGURE 1. In FIGURE 2, the strip 18 is shown within the progressive die with the body 12 of the nut 10 projecting downwardly from the embossment, the nut being retained in this position by circular flange 16 which is engaged with the concave side of embossment 22. A die member 30 having a circular opening or recess 32 is shown in co-axial alignment with nut 10, while a backup member 34 of the die is shown in position in engagement with flange 16 of nut 10. The diameter of die opening 32 is slightly less than the across the corners dimension of nut 10, and slightly greater than the across the flats dimension of the nut.

When die member 30 and the nut are driven relative to each other by conventional means not shown, from the position of FIGURE 2 to that of FIGURE 3, the die shaves metal from each of the corners of nut 10, the shaved metal piling up ahead of the die to form the projections 28. The stroke of die 30 relative to the nut is regulated to stop just short of embossment 22 so that the projections 28 are still strongly adhered to the nut body and, at the same time, are pressed into engagement with the convex side of embossment 22. The embossment is thus firmly clamped between the circular flange 16 of the nut and the integral projections 28 formed on the nut by the shaving or staking action of die 30.

Referring now partiuularly to FIGURE 2, it will be seen that the distance by which embossment 22 is offset from the general plane of strip 18 slightly exceeds the thickness of the circular flange 16 of nut 10 so that in the completed clip nut, the flange is somewhat with respect to the inner side of the leg of the clip on which the empossment is formed. This distance—i.e. difference between depth of embossment offset and flange thickness—is quite small—of the order of 10 to 15 thousandths of an inch. It will be further noted in FIGURE 2 that the flat portion of the embossment 22 is integrally connected to the main body by outwardly inclined sections 36.

Referring now to the completed clip nut as shown in FIGURE 6, it is seen that the metal strip which has been severed from the strip 18 of FIGURE 1 has been bent into a generally U-shaped configuration with the distal end of the leg in which embossment 22 has been formed being bent upwardly as at 38. The clip is so bent that the opening 20 in one leg is in co-axial alignment with the nut.

When the bolt is installed in the nut it is threaded through the various panels all, or at least some of which, are spanned by the bridging portion of the clip, with the bolt first passing through opening 20 and then being threaded into the nut. When the bolt is threaded so that it beings to clamp the parts together, the inclined sections 36 will deflect under the loading applied by the bolt, thus permitting the bolt to draw the face of circular flange 16 of the nut into contact with the surface of the adjacent panel thus establishing an annular area of contact between the panel and the nut.

While one embodiment of the invention has been described in detail, it will be apparent to those skilled in the art that the disclosed embodiment may be modified.

We claim:
1. A clip nut comprising a generally U-shaped sheet metal clip having spaced opposed leg sections, means defining a planar embossment on one of said leg sections offset outwardly from and parallel to the general plane of said one of said leg sections, said embossment having a hexagonal opening therethrough, a nut having a hexagonal body portion and a circular flange at one end thereof having a diameter approximately equal to the across the corners dimension of the hexagonal body and an axial thickness consituting only a minor portion of the axial length of said nut, said nut body being received within said opening with the major portion of the nut projecting outwardly therethrough with said flange engaged with the inner side of said embossment, and an integral projection at each corner edge of said hexagonal body projecting outwardly from the body and each such projection terminating in an apex located at the plane of the outer side of said embossment and cooperable with said flange to retain said nut against axial movement within said opening.

2. A clip nut as defined in claim 1 wherein said embossment is offset from the general plane of said one leg section by a distance slightly greater than the axial thickness of said flange, said embossment extending entirely across the transverse width of said one leg.

References Cited
UNITED STATES PATENTS

| | | | |
|---|---|---|---|
| 2,191,192 | 2/1940 | Ross | 151—41.72 |
| 2,516,274 | 7/1950 | Tinnerman | 151—41.75 |
| 2,633,175 | 3/1953 | Desbrueres | 151—41.76 |
| 3,116,776 | 1/1964 | Flora | 151—41.75 |
| 3,219,087 | 11/1965 | Zahodiakin | 151—41.76 |
| 3,283,794 | 11/1966 | Steward et al. | 151—41.75 |

FOREIGN PATENTS

| | | |
|---|---|---|
| 459,349 | 1/1937 | Great Britain. |
| 603,198 | 6/1948 | Great Britain. |
| 678,839 | 9/1952 | Great Britain. |

MARION PARSONS, JR., Primary Examiner